US007639815B2

(12) United States Patent
Cho et al.

(10) Patent No.: US 7,639,815 B2
(45) Date of Patent: *Dec. 29, 2009

(54) DIGITAL CONTENT DECRYPTING APPARATUS AND OPERATING METHOD THEREOF

(75) Inventors: Young-Soon Cho, Pyungtaek (KR); Myeong-Joon Kang, Pyungtaek (KR); Jae-Young Kim, Seoul (KR); Han Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,202

(22) Filed: Jul. 20, 2009

(65) Prior Publication Data

US 2009/0276628 A1 Nov. 5, 2009

Related U.S. Application Data

(60) Continuation of application No. 11/979,690, filed on Nov. 7, 2007, which is a division of application No. 09/499,633, filed on Feb. 8, 2000, now Pat. No. 7,324,974.

(30) Foreign Application Priority Data

Feb. 9, 1999 (KR) ................... 1999-4483
Feb. 9, 1999 (KR) ................... 1999-4493

(51) Int. Cl.
*H04L 9/12* (2006.01)
(52) U.S. Cl. ..................................... 380/259
(58) Field of Classification Search ........................ None
See application file for complete search history.

(56) References Cited

U.S. PATENT DOCUMENTS 4,797,672 A * 1/1989 Kousa ........................ 340/5.26

(Continued)

FOREIGN PATENT DOCUMENTS

CN 1202658 12/1998

(Continued)

OTHER PUBLICATIONS

T. Yamamoto et al., Technical Report of IEICE, ISEC 93-29, vol. 93, No. 208, (1993), pp. 65-75.

(Continued)

*Primary Examiner*—Emmanuel Moise
*Assistant Examiner*—David J Pearson
(74) *Attorney, Agent, or Firm*—Birch, Stewart, Kolasch & Birch, LLP

(57) ABSTRACT

A device and method for decrypting digital contents are discussed. According to an embodiment, a method for decrypting digital content at a target device, includes receiving the digital content without a source encryption key from a source device connected to the target device, the digital content having been encrypted with the source encryption key in the source device, wherein the source device is configured to perform an authenticating operation with the target device by using an identifier (ID) associated with at least one of the target device and a storage medium of the target device; performing a first addition operation by using a first target internal key and the ID; generating a target encryption key based on an output of the first addition operation and a second target internal key by using a predetermined encryption algorithm; and decrypting the encrypted digital content using the target encryption key.

10 Claims, 3 Drawing Sheets

U.S. PATENT DOCUMENTS

| | | | |
|---|---|---|---|
| 5,673,316 A | 9/1997 | Auerbach et al. | |
| 5,784,464 A | 7/1998 | Akiyama et al. | |
| 5,933,498 A | 8/1999 | Schneck et al. | |
| 6,094,487 A * | 7/2000 | Butler et al. | 380/270 |
| 6,868,404 B1 | 3/2005 | Ono et al. | |
| 7,058,819 B2 | 6/2006 | Okaue | |
| 2001/0016836 A1 | 8/2001 | Boccon-Gibod et al. | |
| 2002/0059363 A1* | 5/2002 | Katz et al. | 709/203 |
| 2002/0083319 A1* | 6/2002 | Ishiguro et al. | 713/168 |

FOREIGN PATENT DOCUMENTS

| | | | |
|---|---|---|---|
| EP | 0874300 | A2 | 10/1998 |
| EP | 0874300 | A2 | 10/1998 |
| JP | 8-69419 | A | 3/1996 |
| JP | 10-191036 | A | 7/1998 |
| JP | 10-260902 | A | 9/1998 |
| KR | 10-1998-0081704 | | 11/1998 |
| KR | 10-1998-0083221 | | 12/1998 |
| WO | WO-01/93002 | A2 | 12/2001 |

OTHER PUBLICATIONS

Menezes, Alfred, J et al. "Handbook of Applied Cryptography" (c) 1997 CRC Press. pp. 568-570.

* cited by examiner

DIGITAL CONTENT DECRYPTING APPARATUS AND OPERATING METHOD THEREOF

CROSS REFERENCE TO RELATED APPLICATIONS

This is a Continuation Application of co-pending U.S. patent application Ser. No. 11/979,690 filed on Nov. 7, 2007, which is a Divisional Application of U.S. application Ser. No. 09/499,633 filed on Feb. 8, 2000 (now U.S. Pat. No. 7,324,974 issued on Jan. 29, 2008), which claims priority under 35 U.S.C. §119(a) to Patent Application No. 4483/1999 and No. 4493/1999 filed in the Republic of Korea on Feb. 9, 1999, respectively. The entire contents of each of these applications are hereby incorporated by reference.

BACKGROUND OF THE INVENTION

1. Field of the Invention

The present invention relates in general to preventing a program, which has been transmitted through a computer communication network such as the Internet, from being illegally reproduced. More particularly, the invention relates to an apparatus and method for encrypting a digital data file in such a manner that the digital data file cannot be decrypted even if the encrypted data file is intercepted while being downloaded to a digital data player, and to an apparatus and method for decrypting the encrypted data files.

2. Description of the Related Art

MP3 (shorthand for MPEG-1 Layer 3 Audio) is one of various available digital data formats for audio data. An MP3 player is a new notional, portable digital device capable of readily downloading and reproducing desired data from a computer communication network using an audio data compression coding technique prescribed in MPEG-1 Layer 3. The MP3 player has few faults and excellent sound quality because it stores a file in the form of digital data. Further, the MP3 player is small in size and light in weight, thereby assuring high portability such that a user can carry it even during his physical exercise. For these reasons, this product is a viable alternative to a portable cassette tape recorder and compact disk (CD) player.

With reference to FIG. 1, there is shown in block form a conventional arrangement of a digital data player and associated peripheral devices. In this drawing, the reference numeral 10 denotes a digital data server which assigns an identification (ID) number and password (PWD) to a personal computer 20 for user registration, and which also transmits a digital data player 22 in software form to the personal computer 20. Upon receiving a file supply request from the user, the digital data server 10 identifies the user on the basis of an ID number and password entered by him and supplies an encrypted digital data file to the user in accordance with this identification. The personal computer 20 stores the digital data file supplied from the digital data server 10 on a hard disk 21 therein and decrypts it through the downloaded software player 22 to reproduce the resultant unencrypted digital data file or to download it to a digital data playing device 30. The digital data playing device 30 downloads the unencrypted data file from the personal computer 20 and stores it in a memory unit 40 for the reproduction thereof. The memory unit 40 downloads the unencrypted digital data file from the digital data playing device 30 and stores it in its internal memory 42 to output the file for a desired playing operation.

The operation of the conventional arrangement with the above-mentioned construction will now be described.

In order to legally receive a desired digital data file from the digital data server 10, the user has to register with a digital data file supplier. During user registration, the user is assigned with an ID number and password from the digital data file supplier. Then, the user downloads a digital data player 22 in software form from the digital data server 10 through a communication network and installs the downloaded digital data player 22 in the personal computer 20.

Thereafter, to download a desired digital data file from the digital data server 10 through the personal computer 20 and a communication network, the user transmits his ID number and password to the digital data server 10 through the personal computer 20 and communication network. The digital data server 10 identifies the user on the basis of the transmitted ID number and password and supplies the desired digital data file to the user in accordance with the identification. At this time, the digital data server 10 encrypts the digital data file using the user's ID number as an encryption key and transmits the encrypted digital data file to the personal computer 20.

The personal computer 20 stores the digital data file transmitted from the digital data server 10 on the hard disk 21. Then, upon receiving a reproduction request from the user, the personal computer 20 decrypts and reproduces the stored digital data file via the digital data software player 22. As a result, the user is able to listen to desired music through the personal computer 20.

On the other hand, if the user intends to listen to music in a digital data file form using the portable digital data playing device 30, then the personal computer 20 decrypts the digital data file, stored on the hard disk 21 with the digital data software player 22, and sends the decrypted digital data file to the digital data playing device 30 through a download unit 23 therein and a communication network.

Then, the digital data playing device 30 stores the digital data file, sent along the above path, in the memory 42 of the memory unit 40, which is typically in the form of a removable card. If the user requests the digital data player 30 to reproduce the digital data file stored in the memory 42, then the digital data player 30 reads the stored digital data file from the memory 42 and reproduces it through a decoder 32 therein. As a result, the user can listen to desired music anywhere using the digital data player 30.

However, the above-mentioned conventional arrangement has a disadvantage in that the digital data file may be intercepted from the communication network during downloading from the personal computer to the digital data playing device (or from the digital data playing device to the memory card) in an unencrypted condition. Such an interception of the unencrypted digital data file makes it impossible to protect the copyright of a music copyright holder and music copyright associates (for example, a music producer and planner taking charge of music production, duplication and distribution).

SUMMARY OF THE INVENTION

Therefore, the present invention has been made in view of the above problems and other problems associated with the related art, and it is an object of the present invention to provide an apparatus and method for encrypting a digital data file in such a manner that an unencrypted digital data file cannot be intercepted in the process of being downloaded from a personal computer to a digital data player and, in turn, from the digital data player to a memory card, and to provide an apparatus and method for decrypting the encrypted digital data files.

It is another object of the present invention to provide a digital data file encryption apparatus and method which are capable of encrypting an encryption key itself in such a manner that, even when the encryption key is extracted from an encrypted digital data file, the key cannot be decrypted and the digital data file cannot thus be decrypted.

In accordance with one aspect of the present invention, there is provided an encryption apparatus for decrypting an encrypted digital data file from a server, including a digital data playing device for receiving the encrypted digital data file, storing the encrypted digital data file in a data storage medium, and decrypting the stored digital data file using an encryption key, wherein the encryption key is generated on the basis of an identification number of the data storage medium or an identification number of the digital data playing device.

In accordance with another aspect of the present invention, there is provided a method for encrypting or decrypting a digital data file, including adding a first internal key to an identification number of a digital data player or an identification number of a data storage medium associated therewith, thereby generating a first encryption key; and encrypting or decrypting the digital data file based on the first encryption key.

In accordance with another aspect of the present invention, there is provided a program (or script) embodied on a computer-readable medium for encrypting or decrypting a digital data file, the computer-readable-medium-embodied program including a first program code segment to input an identification number of a digital data player or a data storage medium associated with the digital data player; a second program code segment to add a first internal key to the inputted identification number to convert the identification number into a first encryption key; and a third program code segment to encrypt or decrypt a digital data file based on the first encryption key.

In accordance with another aspect of the present invention, there is provided a method for decrypting digital content at a target device, the method comprising: receiving the digital content without a source encryption key from a source device connected to the target device, the digital content having been encrypted with the source encryption key in the source device, wherein the source device is configured to perform an authenticating operation with the target device by using an identifier (ID) associated with at least one of the target device and a storage medium of the target device; performing a first addition operation by using a first target internal key and the ID, the first target internal key being associated with the target device; generating a target encryption key based on an output of the first addition operation and a second target internal key by using a predetermined encryption algorithm, wherein the second target internal key is associated with the target device; and decrypting the encrypted digital content using the target encryption key, wherein the source encryption key is identical to the target encryption key, the source encryption key being independently generated in the source device.

In accordance with another aspect of the present invention, there is provided a target device for decrypting digital content, the target device comprising: a controller configured to control the target device to: receive the digital content without a source encryption key from a source device connected to the target device, the digital content having been encrypted with the source encryption key in the source device, wherein the source device is configured to perform an authenticating operation with the target device by using an identifier (ID) associated with at least one of the target device and a storage medium of the target device; perform a first addition operation by using a first target internal key and the ID, the first target internal key being associated with the target device; generate a target encryption key based on an output of the first addition operation and a second target internal key by using a predetermined encryption algorithm, wherein the second target internal key is associated with the target device; and decrypt the encrypted digital content using the target encryption key, wherein the source encryption key is identical to the target encryption key, the source encryption key being independently generated in the source device.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
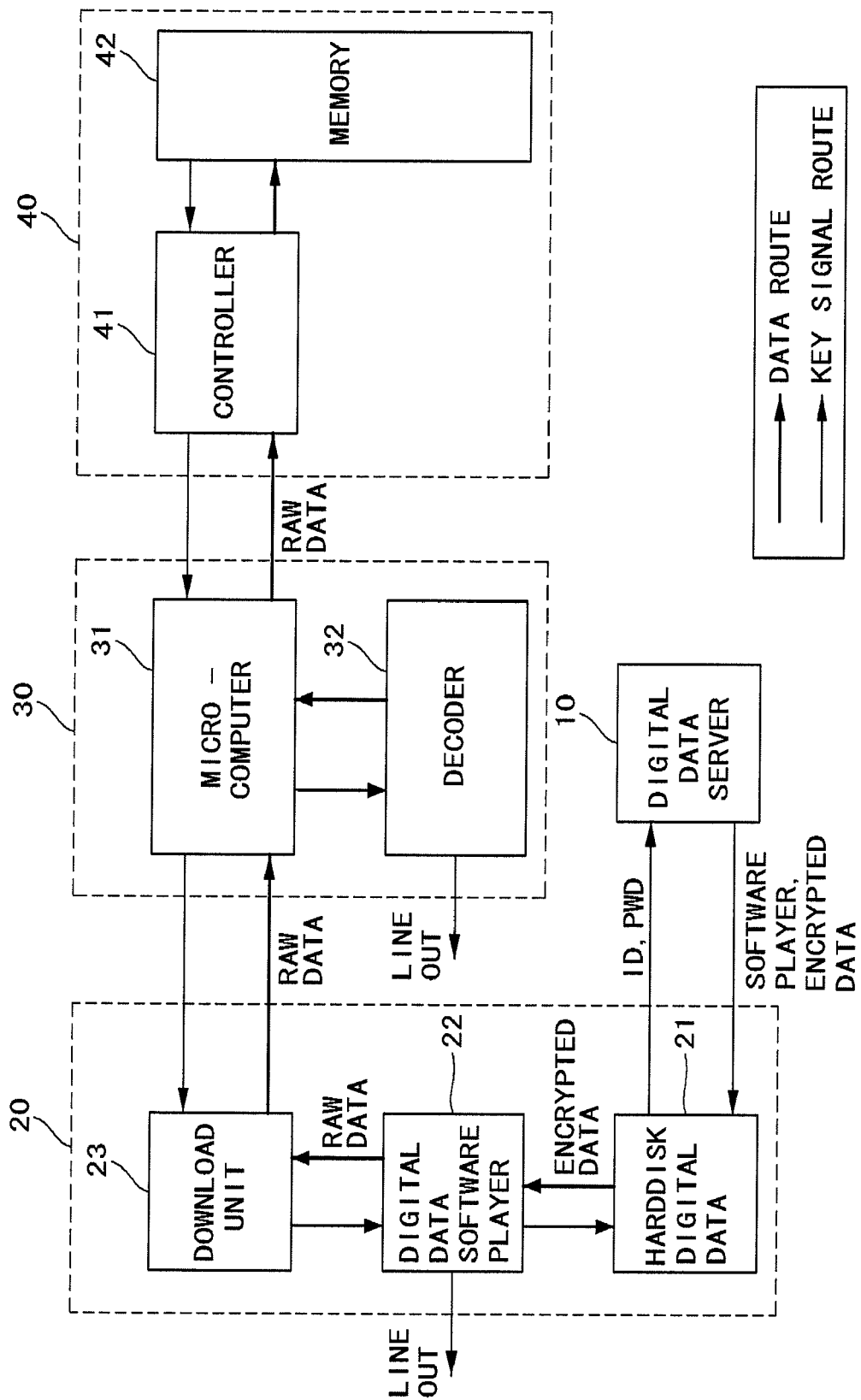
FIG. 1 is a block diagram of a conventional arrangement of a digital data player and the associated peripheral devices.
Figure 2:
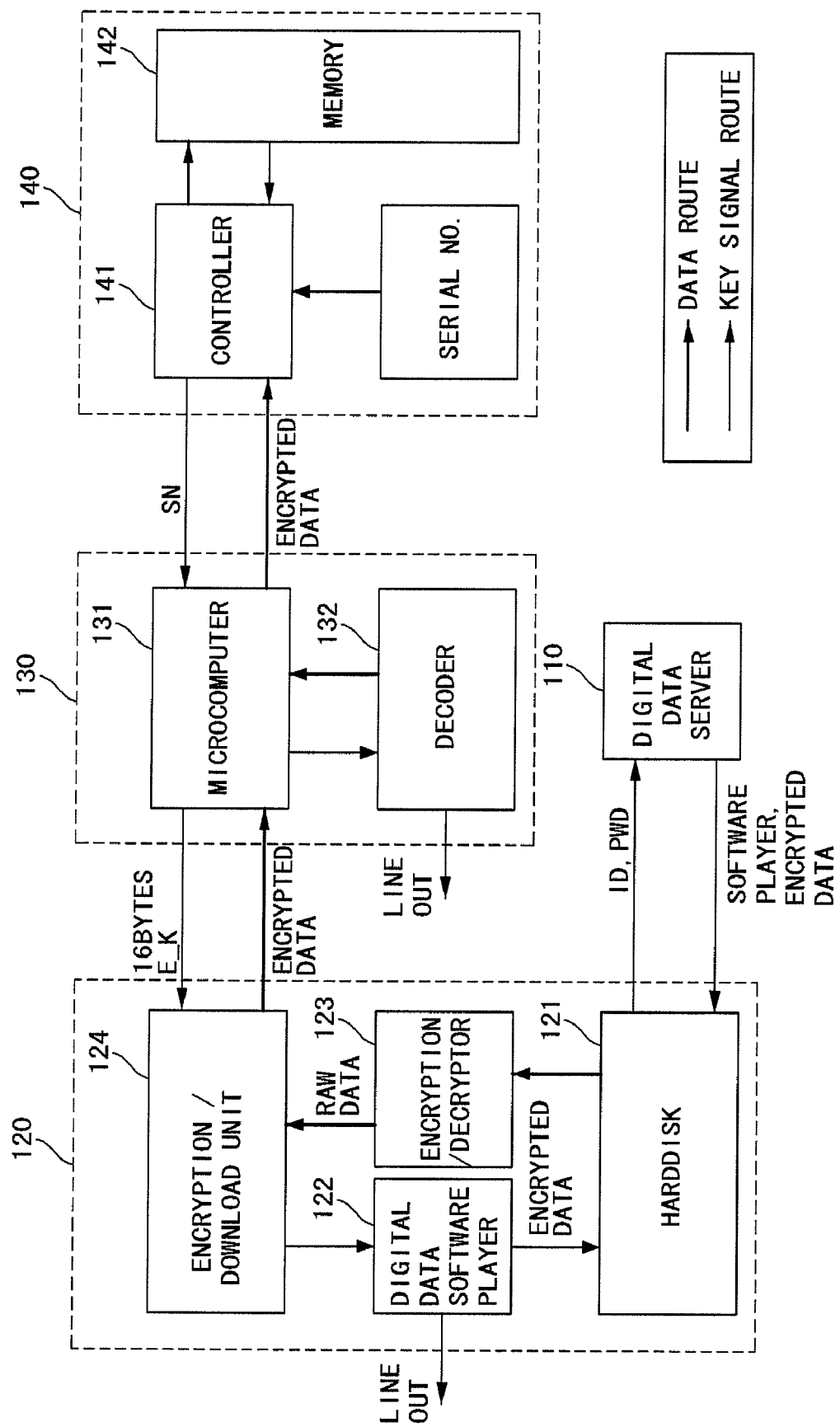
FIG. 2 is a block diagram of a digital data file encryption apparatus for a digital data player in accordance with the present invention.

With reference to FIG. 2, there is shown in block form the construction of a digital data file encryption apparatus for a digital data player in accordance with the present invention. The operation of the digital data file encryption apparatus according to the present invention will hereinafter be described in detail.

First, the user must register with a digital data file supplier to legally receive a desired digital data file from a digital data server 110. During user registration, the user is assigned with an ID number and password (PWD) from the digital data file supplier. Then, the user downloads a digital data player 122 in a software form from the digital data server 110 through a communication network and installs the downloaded digital data player 122 in a personal computer 120. An encryption/decryptor 123 and the encryption/download unit 124, also in software form, may be downloaded and installed in the personal computer 120 at the same time as the player 122, if they have not been previously installed.

Thereafter, the user transmits his ID number and password to the digital data server 110 through the personal computer 120 and communication network to download a desired digital data file from the digital data server 110. The digital data server 110 identifies the user on the basis of the transmitted ID number and password and supplies the desired digital data file to the user in accordance with the identified result. At this time, the digital data server 110 encrypts the digital data file using the user's ID number as a first encryption key and transmits the encrypted digital data file to the personal computer 120. The personal computer 120 stores the digital data file transmitted from the digital data server 110 on a hard disk 121 therein. Then, upon receiving a reproduction request from the user, the personal computer 120 decrypts and reproduces the stored digital data file through the digital data software player 122 using the first encryption key. As a result, the user can listen to desired music through the personal computer 120.

On the other hand, when the user intends to listen to music in a digital data file form using a digital data playing device 130, the personal computer 120 reads an ID number of a removable data storage medium 140 (or of the playing device 130, or some combination thereof) through the digital data playing device 130 and an interconnecting communication network and generates a second encryption key on the basis of the read ID number. At this time, the digital data playing device 130 generates the same second encryption key using the ID number of the data storage medium 140 (or playing device 130), in a similar manner as the personal computer 120.

In the personal computer 120, an encryption/decryptor 123 decrypts the digital data file, which is stored on the hard disk 121, using the first encryption key. An encryption/download unit 124 re-encrypts the decrypted digital data file from the encryption/decryptor 123 using the second encryption key and sends the re-encrypted digital data file to the digital data playing device 130 through the communication network.

The digital data playing device 130 stores the re-encrypted digital data file downloaded from the personal computer 120 in a memory 142 of the removable data storage medium 140. If the user requests the digital data playing device 130 to reproduce the digital data file stored in the memory 142, then the digital data playing device 130 reads the stored digital data file from the memory 142 and reproduces it through a decoder 132 therein. At this time, the digital data file read from the data storage medium 140 has to be decrypted for the reproduction using the second encryption key.

To this end, in the digital data playing device 130, a microcomputer 131 decrypts the digital data file read from the data storage medium 140 using the second encryption key generated on the basis of the ID number of the data storage medium 140 and outputs the decrypted digital data file to an output line through the decoder 132.

As a result, the user can listen to desired music anywhere using the digital data playing device 130, and interception of the unencrypted digital data file can be prevented during downloading.

There may be various methods for generating the encryption key using the ID number of the data storage medium 140. For example, a 16-byte encryption key (E-K) may be generated including three bytes representing a manufacturing company name, twelve bytes representing a serial number (SN) of the data storage medium 140 and one byte arbitrarily set in the system. A similar method may be used for generating an E-K using the playing device 130. As shown in FIG. 2, the 16-byte E-K generated by the playing device 130 may be transmitted to the encryption/download unit 124 through the interconnecting communication network and used to encrypt the data from the encryption/decryptor 123.

Figure 3:
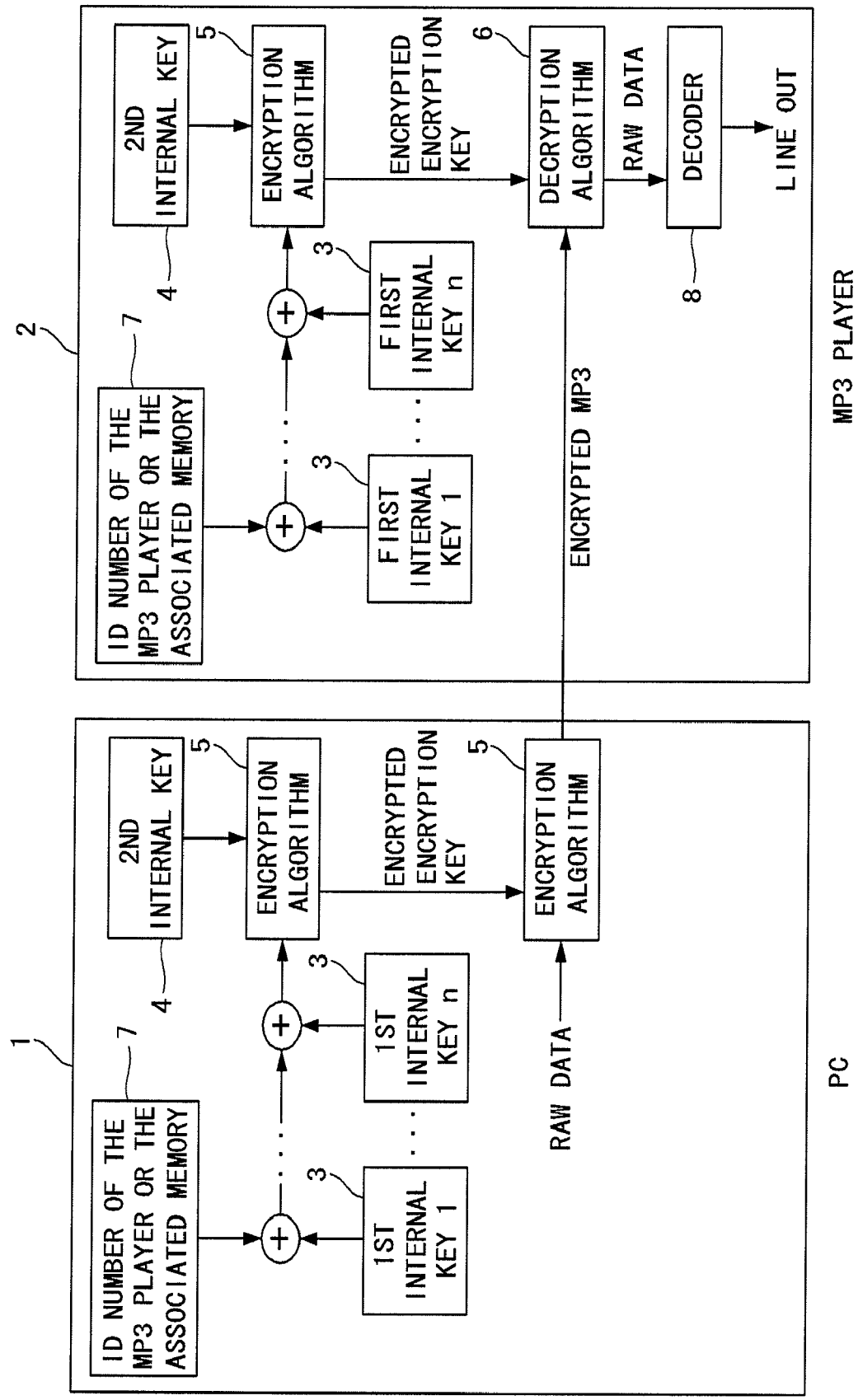
FIG. 3 is a block diagram illustrating a method for encrypting and decrypting a digital data file in a digital data player in accordance with the present invention.

FIG. 3 is a block diagram illustrating a method for encrypting and decrypting a digital data file in a digital data player in accordance with the present invention. First, a portable MP3 playing device 2 is connected to a personal computer 1 via an interface (not shown) to download a desired digital data file from the personal computer 1. Then the personal computer 1 requests and inputs information regarding an ID number 7 (serial number) of the MP3 playing device 2 or the associated memory (not shown) using a control command based on a communication convention between the two devices.

The personal computer 1 utilizes the inputted ID number 7 of the MP3 playing device 2 or its media as a user authentication number, resulting in no need for a separate user authentication process. Also, in order to prevent hacking (i.e., circumvention of the authentication by way of software), the personal computer 1 adds a first internal key 3 based on a convention between the two devices (or based on an initiation number associated with the personal computer 1 or the MP3 playing device 2) to the inputted ID number 7 in order to convert the inputted ID number 7 into an encryption key. In this manner, the ID number of the MP3 playing device 2 or the associated memory can be used as an encryption key. Although one first internal key is described, two or more first internal keys 3 may be used according to the convention between the two devices to make decryption more difficult.

It should be noted that a converted encryption key has conventionally been used to encrypt a digital data file. However, in the present invention, the converted encryption key itself is encrypted according to an encryption algorithm 5 applied with a second internal key 4 based on the convention between the two devices. Then the encrypted key is used to encrypt a digital data file.

Although a key encryption algorithm, not a file encryption algorithm, may be applied to encrypt the encryption key, it is preferred that the file encryption algorithm 5 be applied in consideration of low-execution capability of a microprocessor (not shown) used in the portable MP3 playing device 2. Use of the file encryption algorithm 5 results in a reduction in size of a program memory for algorithm storage and an increase in processing efficiency. Because the ID number 7 of the storage medium or playing device is added with the first internal key 3 and the resultant encryption key is encrypted according to the encryption algorithm 5 based on the second internal key 4 in the above manner, it is impossible to recognize the encryption key itself during transmission from the computer 1 to the playing device 2. A subsequent operation is performed by encryption algorithm 5 in a conventional manner to encrypt a digital data file using the encrypted encryption key and send the encrypted digital data file to the portable MP3 playing device 2.

In the same manner as the personal computer 1, the portable MP3 playing device 2 generates the same encrypted encryption key by adding the first internal key 3 to the ID number 7 of the device (or memory) and encrypting the resultant encryption key according to the encryption algorithm 5 using the second internal key 4. Then, upon receiving the encrypted digital data file from the personal computer 1, the portable MP3 player 2 decrypts the received digital data file according to a decryption algorithm 6 based on the encrypted encryption key and outputs the resultant decrypted MP3 file through a decoder 8.

As apparent from the above description, according to the present invention, both the personal computer and digital data player generate the same encryption key using an ID number 7 of the memory card (or of the MP3 player). A digital data file is encrypted on the basis of the generated encryption key in such a manner that it interception of an unencrypted data file can be prevented during downloading. In particular, the encryption key itself is encrypted. Therefore, even when the encryption key is extracted during transmission, it cannot be decrypted, and the digital data file can thus be prevented from being hacked (i.e., decoded using an illicitly obtained encryption key).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for decrypting digital content at a target device, the method comprising:

receiving the digital content without a source encryption key from a source device connected to the target device, the digital content having been encrypted with the source encryption key in the source device, wherein the source device is configured to perform an authenticating operation with the target device by using an identifier (ID) associated with at least one of the target device and a storage medium of the target device;

performing a first addition operation by using a first target internal key and the ID, the first target internal key being associated with the target device;

generating a target encryption key based on an output of the first addition operation and a second target internal key by using a predetermined encryption algorithm, wherein the second target internal key is generated at the target device; and decrypting the encrypted digital content using the target encryption key, wherein the source encryption key is identical to the target encryption key, the source encryption key being independently generated in the source device.

2. The method of claim 1, wherein the source encryption key is generated by:

performing a second addition operation by using the ID and a first source internal key associated with the source device; and generating the source encryption key by using an output of the second addition operation and a second source internal key associated with the source device by using the predetermined encryption algorithm.

3. The method of claim 2, wherein the first and second source internal keys are included in the source device, and the first and second target internal keys are included in the target device.

4. The method of claim 3, wherein the first source internal key is identical to the first target internal key and the second source internal key is identical to the second target internal key.

5. The method of claim 1, further comprising transmitting the ID to the source device.

6. A target device for decrypting digital content, the target device comprising:

a receiver configured to receive the digital content without a source encryption key from a source device connected to the target device, the digital content having been encrypted with the source encryption key in the source device, wherein the source device is configured to perform an authenticating operation with the target device by using an identifier (ID) associated with at least one of the target device and a storage medium of the target device;

a processor configured to control the target device to:

perform a first addition operation by using a first target internal key and the ID, the first target internal key being associated with the target device; and generate a target encryption key based on an output of the first addition operation and a second target internal key by using a predetermined encryption algorithm, wherein the second target internal key is generated at the target device; and a decryptor configured to decrypt the encrypted digital content using the target encryption key, wherein the source encryption key is identical to the target encryption key, the source encryption key being independently generated in the source device.

7. The target device of claim 6, wherein the source encryption key is generated by:

performing a second addition operation by using the ID and a first source internal key associated with the source device; and generating the source encryption key by using an output of the second addition operation and a second source internal key associated with the source device by using the predetermined encryption algorithm.

8. The target device of claim 7, wherein the first and second source internal keys are included in the source device, and the first and second target internal keys are included in the target device.

9. The target device of claim 8, wherein the first source internal key is identical to the first target internal key and the second source internal key is identical to the second target internal key.

10. The target device of claim 6, the target device further configured to transmit the ID to the source device.

* * * * *